United States Patent
Foulger

(12) 
(10) Patent No.: US 6,331,353 B1
(45) Date of Patent: Dec. 18, 2001

(54) STRANDED CONDUCTOR FILLING COMPOUND AND CABLES USING SAME

(75) Inventor: Stephen H. Foulger, Lexington, SC (US)

(73) Assignee: Pirelli Cables and Systems LLC, Lexington, SC (US)

(*) Notice: Subject to any disclaimer, the term of this patent is extended or adjusted under 35 U.S.C. 154(b) by 0 days.

(21) Appl. No.: 09/375,717

(22) Filed: Aug. 17, 1999

(51) Int. Cl.$^7$ .............................. B32B 15/00; H01B 1/06; H01B 11/02

(52) U.S. Cl. ......................... 428/379; 428/372; 428/383; 252/511; 524/495; 174/113 R; 174/110 SR; 174/110 PM; 174/120 SR

(58) Field of Search ............................. 252/511; 524/495, 524/524, 574, 500; 174/113 R, 110 SR, 120 SR, 110 PM; 428/372, 379, 383

(56) References Cited

U.S. PATENT DOCUMENTS

| | | |
|---|---|---|
| 3,943,271 | 3/1976 | Bahder et al. . |
| 4,095,039 | 6/1978 | Thompson . |
| 4,145,567 | 3/1979 | Bahder et al. . |
| 4,929,388 * | 5/1990 | Wessling . |
| 5,049,593 | 9/1991 | Marciano-Agostinelli et al. . |
| 5,844,037 * | 12/1998 | Lungard et al. ............... 524/496 |

FOREIGN PATENT DOCUMENTS

| | | |
|---|---|---|
| 27 48 762 | 5/1978 | (DE) . |
| 0 068 308 | 1/1983 | (EP) . |
| 337487 * | 10/1989 | (EP) . |
| 2 378 337 | 8/1978 | (FR) . |
| 01 217803 | 8/1989 | (JP) . |
| WO 96 36054 | 11/1996 | (WO) . |

* cited by examiner

*Primary Examiner*—Cynthia H. Kelly
*Assistant Examiner*—J. M. Gray
(74) *Attorney, Agent, or Firm*—Norris, McLaughlin & Marcus

(57) ABSTRACT

A strand filling compound for electrical cables, and cables including such a compound, which prevents migration of water lengthwise of the stranded wires of the conductor of the cable. The strand filling compound has a low conductive filler content without reducing the level of conductivity of the compound and is readily pumpable at temperatures above about 100° C. The strand filling compound is provided by employing an immiscible polymer blend containing conductive filler located primarily in one phase, the immiscible polymer blend being comprised of a low molecular weight polymer and a second polymer, preferably an adhesive EVA. Preferably an adhesive extender which is miscible with the low molecular weight polymer, and fine particles of a material admixed with the filling compound and/or provided as a thin layer of fine particles of a material applied over the filling compound which swells when it absorbs water are also included in the filling compound.

21 Claims, 5 Drawing Sheets temperature response of standard binary conductive composite and experimental composites based on immiscible blends.

STRANDED CONDUCTOR FILLING COMPOUND AND CABLES USING SAME

BACKGROUND OF THE INVENTION

1. Field of the Invention

The present invention relates to a strand filling compound for electrical cables, and cables including such a compound, which prevents migration of water lengthwise of the stranded wires of the conductor of the cable.

2. Description of the Prior Art

It is known in the art that cable insulation is deteriorated by the development and propagation of water/chemical trees when moisture is present in regions of the insulation structure of the cable and particularly in regions of localized high electrical stress caused by voids, contaminants and protrusions from the conductor and insulation stress control layers. Water present in the spaces between the strands of a multistranded conductor is recognized as significantly accelerating the propagation of water/chemical trees in the insulation. It is therefore desirable to fill all spaces between such wires with a filling compound so as to minimize or prevent ingress and movement of water in such spaces. See, for example, U.S. Pat. Nos. 5,049,593; 4,095,039; 4,145,567; and 3,943,271.

As pointed out in U.S. Pat. No. 4,095,039, some of the prior art filling compounds are not satisfactory after aging due to loss of adhesive qualities and hardening and fracturing thereof. The patent discloses the use of low molecular weight polyisobutylene rubber or a low molecular weight copolymer of isobutylene-isoprene rubber with 40–150 parts by weight of electrically conductive carbon black or graphite added thereto as a filling compound, such compound having a putty-like consistency at room temperature and good adhesiveness which is retained during operation of the cable.

Another advantage indicated by the use of the filling compound disclosed in U.S. Pat. No. 4,095,039 is that the filling compound can be applied by means of a pump supplying the compound to an applicator where the spaces between the wires are filled and the wires coated. This indicates that the compound is flowable and does not require high pressures for its application. This property eliminates the need for an extrusion head and the expense thereof which is necessary for some filling compounds which can be extruded over the wires.

U.S. Pat. No. 4,145,567 discloses a similar filling compound made of ethylene propylene rubber compounded with a substantial amount of carbon black so as to give it a putty-like consistency and a drip-point above 100° C.

It has been found that the filling compounds of said U.S. Pat. Nos. 4,095,039 and 4,145,567 are quite effective as filling compounds for stranded conductors of electrical cables, but it has also been found that some problems still exist from the standpoint of preventing ingress and flow of water in the conductor while preventing overfill of the spaces under the outer layer of wires. Thus it has been found that under some conditions, such as cable handling, subsequent manufacturing operations and after accelerated cyclic aging test simulating cyclic loading of the cable in the field some ingress of water into the conductor and movement over a limited length of the conductor may occur although a significant improvement has been achieved.

Furthermore, in the manufacturing operation of completely filling the spaces between the strands, the volume of filling compound is difficult to control and the extent of the fill can vary along the length of the stranded conductor. In this regard it should be recognized that normally the outer interstices of the stranded conductor are filled by the pressure extrusion of the conductor stress control layer and no supplemental filling of the spaces in required. Where the spaces between the outer layer of wires and the next to outer layer of wires is overfilled with filling compound, the extrusion of the semiconducting stress control layer over the stranded conductor can cause penetration of filling compound into the outer interstices of the conductor resulting in protrusion of the extruded semiconducting stress control layer into the insulation. Since such protrusions result in localized high electrical stresses in the insulation, such effects are highly undesirable. In some cases, it is considered desirable to also fill the outer interstices of the conductor with filling compound in which case a semiconducting rubber filled tape is applied lapped on itself over the completely filled conductor followed by extrusion of the semiconducting stress control layer. In this case overfilling of the spaces between the outer layer of wires and the next to outer layer of wires is not objectionable and does not represent a problem.

U.S. Pat. No. 5,049,593, which is incorporated herein by reference, has solved the foregoing problems by providing an improved filling compound of the type disclosed in said U.S. Pat. Nos. 4,095,039 and 4,145,567. The '593 patent teaches a filling compound comprising a low molecular weight rubber admixed with fine particles of a material and/or with a thin layer of fine particles of material applied over the filling compound which swells when it absorbs water. The filling compound of the '593 compound is provided with 15 to 150 parts by weight of the electrical conductive filler to 100 parts of the low molecular weight rubber (isobutylene rubber) compound and preferably from 15 to 50 parts to impart electrical conductivity to the compound. 5 While the strand filling compound of the '593 patent is very effective, there are some drawbacks which have heretofore been unsolved in the art. Furnace grade carbon black which is the most commonly used conductive filler in prior art strand filling compounds, is known to be a source of ionic contamination in the insulation system. However, furnace grade carbon black is the least expensive conductive filler suitable for strand filling compounds. Therefore, while it is known to use "cleaner" conductive fillers in order to reduce ionic contaminants, in practice, the use of cleaner conductive fillers is cost prohibitive.

Strand filling compounds for use in electrical conductors generally must be pumpable at elevated temperatures about 100° C. or greater; must not drip or flow out of the conductor stands at temperatures at least up to 130° C.; must be compatible with the conductor shield as specified in ICEA Publications T-32-645-1993 "Guide for Establishing Compatibility of Sealed Conductor Filler Compounds with Conducting Stress Control Materials", and T-25-425-1981" Guide for Establishing Stability of Volume Resistivity for Conducting Polymeric Components of Power Cables"; and must pass a water penetration test in accordance with ICEA Publication T-34-664-1996 "Guide for Conducting Longitudinal Water Penetration Resistance Tests on Longitudinal Water Blocked Cables".

It is therefore an object of the present invention to provide a strand filling compound which may be designed with a cleaner conductive filler, such that ionic contamination of the insulation system is minimized, without incurring a cost penalty for the strand filling compound.

It is further an object of the present invention to provide a low cost strand filling compound with the same superior performance as found in the art.

SUMMARY OF THE INVENTION

In accordance with the objects of the present invention, a low cost, moisture blocking, strand filling compound for electrical cables which may be designed to have lower conductive filler content without reducing the level of conductivity of the compound, and which is readily pumped at elevated temperatures above about 100° C., is provided by employing an immiscible polymer blend containing conductive filler located primarily in one phase, the immiscible polymer blend being comprised of a low molecular weight polymer and a second polymer, preferably an adhesive EVA. Preferably an adhesive extender which is miscible with the low molecular weight polymer, and fine particles of a material admixed with the filling compound and/or provided as a thin layer of fine particles of a material applied over the filling compound which swells when it absorbs water are also included in the filling compound.

The moisture blocking performance, conductivity, and drip performance of the strand filling compound of the present invention are comparable to that of the prior art. The use of an immiscible polymer blend with the conductive filler located primarily in one phase of the blend allows the strand filling compound of the present invention to have the same level of conductivity as the prior art with less conductive filler content. The cost savings realized in using less conductive filler may be applied to employing a 'cleaner' conductive filler, in order to reduce ionic contamination without incurring a cost penalty. Additionally the use of an immiscible polymer blend in which one phase is EVA, reduces the content of the low molecular weight polymer found in the prior art, further providing a low cost strand filling compound. An adhesive extender may be included in the strand filling compounds of the present invention, further lowering the cost of the strand filling compound of the present invention.

BRIEF DESCRIPTION OF THE DRAWINGS

Other objects and advantages of the present invention will be apparent from the following description of the presently preferred embodiments thereof, which description should be considered in conjunction with the accompanying drawings in which.

DETAILED DESCRIPTION OF THE INVENTION

Figure 1:
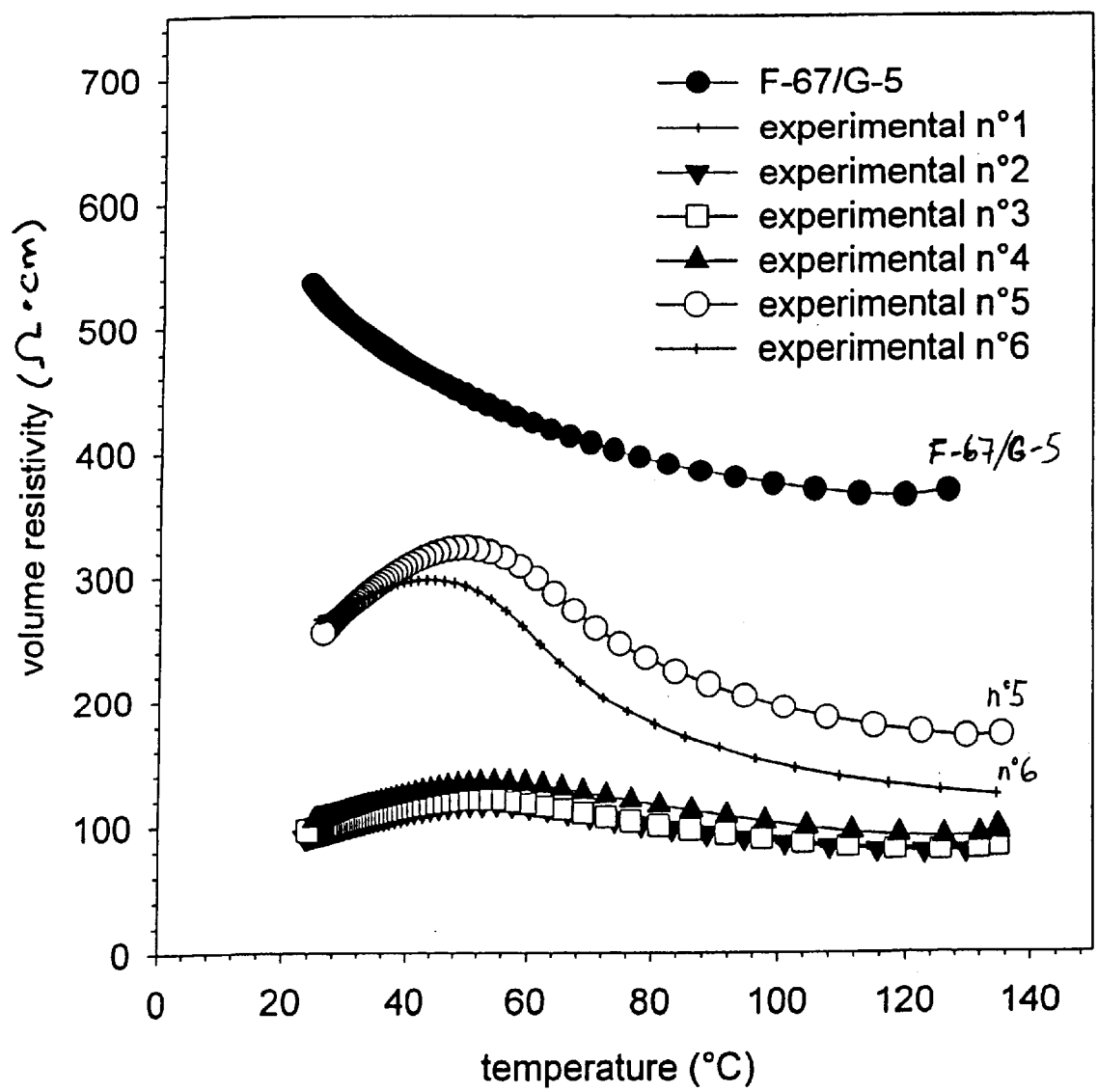
FIG. 1 is chart illustrating the volume resistivity of the inventive strand filling compounds as a function of temperature compared to the strand filling compound of the '593 patent.

The present invention provides a moisture blocking strand filling compound for electrical cables which may be designed to have lower conductive filler content and/or a cleaner conductive filler without incurring a cost penalty. The strand filling compound of the present invention is comprised of an immiscible polymer blend comprising a major phase of a low molecular weight polymer and a minor phase of preferably an adhesive EVA; the major and minor phases being co-continuous. Conductivity is imparted to the strand filling compound by dispersing a conductive filler primarily in one phase of the immiscible blend. The conductive filler is preferentially incorporated into the minor phase material before the minor phase is melt blended with the major phase material. The heretofore described A technique of imparting conductivity to the strand filling compound consists essentially of percolating a conductive filler in a minor phase and then consequently percolating the conductive filler/minor phase composite in a major phase. This technique is termed "multiple percolation" and is based on the physics of network formation of a minor phase material in a differing major phase material. The level at which a minor phase is just sufficiently incorporated volumetrically into a major phase where both phases are co-continuous is termed the percolation threshold. By employing the multiple percolation technique in the present invention, the amount of conductive filler content in the strand filling compound necessary to impart a predetermined level of conductivity to the strand filling compound can be substantially reduced over the amount of conductive filler needed to reach the same predetermined level of conductivity in a single phase compound.

For the purposes of the present invention, the minor phase is defined as that phase of the immiscible polymer blend which has the conductive filler preferentially dispersed therein. This definition of the minor phase does not preclude the minor phase from being larger by weight percent or by volume percent than the major phase polymer(s) so long as the amount of the minor phase in the composite does not preclude the major phase(s) from being co-continuous.

In the preferred embodiment, the major phase material is a low molecular weight polymer, such as poly(isobutylene) (PIB), commercially available under the tradename Vistanex from Exxon Chemical. Other suitable major phase materials include, but are not limited to: low molecular weight copolymers of isobutylene-isoprene rubber and ethylene propylene rubbers, and other polymers which meet the performance criteria as described herein. One skilled in the art will recognize the heretofore described major phase materials are examples and that there are other possible major phase materials.

The minor phase material is preferably an adhesive poly (ethylene-co-vinyl acetate) (EVA). Such EVA's are commercially available under the tradenames Ultrathene 669-67 and Ultrathene 665-67 from Equistar. Other suitable minor phase materials include any polymers, which either themselves or with tackifiers and/or other additives, exhibit sufficient adhesiveness to meet the drip and water penetration criteria described herein. Other suitable minor phase materials include: polymethylacrylate, polyethylacrylate, polymethylmethacrylate, polyethylmethacrylate, polybutylmethacrylate, polyisobutylmethacrylate, polyterbutylmethacrylate, polyethyleneoxide, polytetramethyleneoxide, and polyethyleneterephthalate. In any event, the minor phase and major phase materials must be selected such that they are immiscible, that is, the minor phase material and the major phase material must be selected such that they do not engage in electrostatic interactions which promote miscibility.

The amount of major phase material and minor phase material in the inventive strand filling compound is dependent on the materials selected, but in any event, the minor phase material must be in an amount sufficient to be co-continuous with the major phase material. In examples 1–4 described hereinafter for example, the minor phase material comprised of an adhesive EVA, comprised from about 35% by weight to about 40% by weight of the total compound. In these examples, the major phase material was poly(isobutylene) and comprised about 40% by weight to about 45% by weight of the total composite.

The conductive filler is preferably selected from the group consisting of: carbon black, metallic particles, graphite, and mixtures thereof, but may be any suitable material exhibiting conductivity and should have a chemical structure which results in an inherently high conductivity with an affinity to develop a strong network.

The material chosen for the conductive filler in any of the embodiments of the present invention influences the amount of conductive filler required to meet or exceed the percolation threshold required to form a conductive network when dispersed in the minor phase material. In particular, the carbon black may be an "acetylene black" or a "furnace black" or any commercial grade of conductive carbon black, the acetylene blacks being superior in producing conductive blends. Exemplary carbon blacks are also disclosed in U.S. Pat. No. 5,556,697, the contents of which are herein incorporated by reference. "Furnace blacks" are lower quality carbon blacks and are inferior in their ability to produce conductive blends when compared to "acetylene blacks", which are fabricated from the pyrolysis of acetylene. Therefore "acetylene blacks", which are generally more expensive, are most preferred in the present invention over other carbon black types when low carbon black content is preferred over price, or when a conductive filler which does not produce significant levels of ionic contamination is desired, as acetylene blacks are "cleaner" conductive fillers. However, as can be seen from the hereinafter described working examples, "furnace blacks" are functional in producing a strand filling compound of the present invention.

The amount of conductive filler dispersed in the minor phase material is dependent on the type of conductive filler employed, however in any case the amount of conductive filler, which is preferentially dispersed in the minor phase material, and preferably entirely dispersed in the minor phase material, should be sufficient to generate a continuous conductive network in the minor phase material. In the examples 1–4 described hereinafter, which employ EVA as the minor phase material and a furnace grade carbon black as the conductive filler, the conductive filler comprised 15.3% by weight of the total composite and exceeded the conductivity of the prior art compound by about 400%. Therefore it is evident that, in these examples, the conductive filler content could be less than 15.3% by weight of the total compound, and preferably less than about 10% by weight of the total compound. In examples 5 & 6, described hereinafter, the conductive filler comprised about 10.22% by weight of the total compound, the compound exhibiting a conductivity comparable to prior art strand filling compounds when metallic particles are employed as the conductive filler, the weight percent may be quite high (up to 85% by weight of the total filling compound), while the volume fraction would be very low, (less than about 15% of the total filling compound).

In order to further reduce the cost of the strand filling compound of the present invention, preferably an adhesive extender is incorporated as a filler into the major phase material. The adhesive extender may enhance the tackiness of the strand filling compound and thus improve the moisture blocking performance of the strand filling compound. A suitable adhesive extender is polybutene, which is commercially available under the tradename Indopol H-1500 from Amoco. Other suitable adhesive extenders include any tacky oil. The amount of adhesive extender incorporated into the strand filling compound may be from about 1% by weight to about 20% % by weight of the total compound, and is preferably from about 5% by weight to about 15% by weight of the total compound. The adhesive extender acts as a filler in the major phase and should be miscible with the major phase material.

In order to enhance the moisture blocking performance of the inventive strand filling compound, fine particles of a material admixed with the filling compound and/or provided as a thin layer of fine particles of a material applied over the filling compound which swells when it absorbs water are preferably included in the filling compound. The properties, suitable materials, and amount to be incorporated of these fine particles which swell or expand in the presence of water are effectively described in the heretofore referenced '593 patent.

Other materials may be incorporated into the inventive strand filling compound to enhance properties or to serve as processing aids. Such other materials may be: antioxidants, nucleating agents, reinforcing fillers, plasticizers, processing aids, lubricants, viscosity control agents, tackifiers, anti-blocking agents, extender oils, metal deactivators, and combinations thereof. Such materials may comprise from about 0.05% to about 10% by weight of the total filling compound.

Examples of processing aids include but are not limited to: polyolefin oils, hydrocarbon oils, chlorinated paraffin's, and isobutylene liquid plasticizers. The processing aids are preferably limited to less than 5% by weight of the total filling compound.

The inventive strand filling compounds have the requisite properties for filling the strands in an electrical cable; that is, the inventive compounds are pumpable at elevated temperatures above about 100° C., do not drip or flow from the conductor strands at temperatures of at least 130° C., and have passed the compatibility and water penetration tests specified in ICEA Publications T-32-645-1993, T-25-425-1981, and T-34-664-1996.

Figure 5:
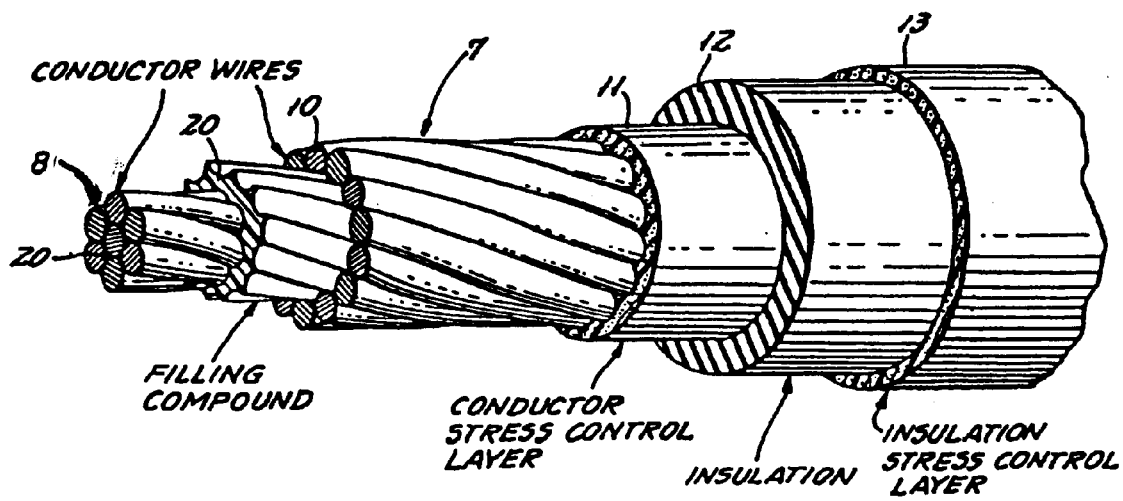
FIG. 5 is a cut-away perspective view of a cable of the invention showing the strand filling compound.

In accordance with the present invention, an electrical cable employing the strand filling compound of the present invention is provided. Referring to FIG. 5, the cable is comprised of at least one layer of aluminum or copper strands (8), stranded together to form a conductor; the strand filling compound (20) filling the interstices of the conductor strands (8). A second layer (10) of aluminum or copper strands is optionally provided. A conductor stress control layer (11) encircles the stranded conductor (7); a layer of insulation (12) encircles the conductor stress control layer (1); and an insulation stress control layer (13) encircles the insulation (12). A metallic shield and an overall plastic jacket (not shown) may optionally be provided.

The principles of the invention can be further illustrated by the following non-limiting examples.

EXAMPLES 1–4

Four stranding filling compounds were made according to the present invention using commercial grades of an adhesive poly(ethylene-co-vinyl acetate) (EVA) minor phase, a poly(isobutylene) (PIB) major phase, and furnace grade carbon black. The characteristics of the materials used in this example are set forth in Tables 1–4.

TABLE 1

Experimental conductor strand sealant n° 1

| component | type | supplier | characteristics | phr | w/w |
|---|---|---|---|---|---|
| Vistanex LM-MH | poly-(isobutylene) | Exxon | cold flow adhesive | 100 | 44.63 |
| Ultrathene 669-67 | poly-(ethylene-co-vinyl | Equistar | MFI = 2700; | 80 | 35.71 |
| Vulcan XC-72 | carbon black | Cabot Corp. | furnace grade | 34.3 | 15.31 |
| Sunpar 150 | polyolefin oil | Sunoco | sulphur = 0.08 w/w | 8.6 | 3.84 |
| Irganox 1010 | antioxidant | CIBA | | 1.15 | 0.51 |
| | | | | 224.05 | 100.00 |

TABLE 2

Experimental conductor strand sealant n° 2

| component | type | supplier | characteristics | phr | w/w |
|---|---|---|---|---|---|
| Vistanex LM-MH | poly-(isobutylene) | Exxon | cold flow adhesive | 100 | 44.63 |
| Ultrathene 665-67 | poly-(ethylene-co-vinyl | Equistar | MFI = 800; | 80 | 35.71 |
| Vulcan XC-72 | carbon black | Cabot Corp. | furnace grade | 34.3 | 15.31 |
| Sunpar 150 | polyolefin oil | Sunoco | sulphur = 0.08 w/w | 8.6 | 3.84 |
| Irganox 1010 | antioxidant | CIBA | | 1.15 | 0.51 |
| | | | | 224.05 | 100.00 |

TABLE 3

Experimental conductor strand sealant n° 3

| component | type | supplier | characteristics | phr | w/w |
|---|---|---|---|---|---|
| Vistanex LM-MH | poly-(isobutylene) | Exxon | cold flow adhesive | 100 | 40.18 |
| Ultrathene 669-67 | poly-(ethylene-co-vinyl | Equistar | MFI = 2700; | 100 | 40.18 |
| Vulcan XC-72 | carbon black | Cabot Corp. | furnace grade | 38.1 | 15.31 |
| Sunpar 150 | polyolefin oil | Sunoco | sulphur = 0.08 w/w | 9.55 | 3.84 |
| Irganox 1010 | antioxidant | CIBA | | 1.26 | 0.51 |
| | | | | 248.91 | 100.00 |

TABLE 4

Experimental conductor strand sealant n° 4

| component | type | supplier | characteristics | phr | w/w |
|---|---|---|---|---|---|
| Vistanex LM-MH | poly-(isobutylene) | Exxon | cold flow adhesive | 100 | 40.18 |
| Ultrathene 665-67 | poly-(ethylene-co-vinyl | Equistar | MFI = 800; | 100 | 40.18 |
| Vulcan XC-72 | carbon black | Cabot Corp. | furnace grade | 38.1 | 15.31 |
| Sunpar 150 | polyolefin oil | Sunoco | sulphur = 0.08 w/w | 9.55 | 3.84 |
| Irganox 1010 | antioxidant | CIBA | | 1.26 | 0.51 |
| | | | | 248.91 | 100.00 |

The strand filling compounds of Tables 1–4 were mixed according to the following procedure in Table 5.

Note that in the present Examples 1–4, two thirds of the total carbon black content was dispersed in the minor phase material before melt blending with the major phase material. The final one-third carbon black content was mixed into the compound after the melt blending of the minor phase and major phase had commenced.

TABLE 5

Mixing procedure of conductor strand sealants n° 1–n° 4

| action | time (min) | temperature |
|---|---|---|
| steam on; mixer off; add 1/3 of XC-72 | 0 | 23.3° C. |
| | 1–6 | |
| | 7 | 87.7° C. |
| add 1/3 of XC-72 | 7–12 | |
| add all of the | 17 | |
| add remaining 1/3 of XC-72 | 20–25 | |
| | 28 | 97.7° C. |
| add Sunpar and Irganox | 28–30 | |
| | 35 | 98.3° C. |

The strand filling compounds made in these examples were measured for volume resistivity over temperature and compared to prior art strand filling compound. The results of these measurements are presented in FIG. 1. As can be seen from the FIG. 1, the inventive strand filling compounds have volume resisitivities significantly below that of the prior art compound (F-67/G-5) with the same amount of conductive filler by weight percent. Additionally, the inventive strand filling compounds do not exhibit the high temperature sensitivity of the prior art compound.

Figure 2:
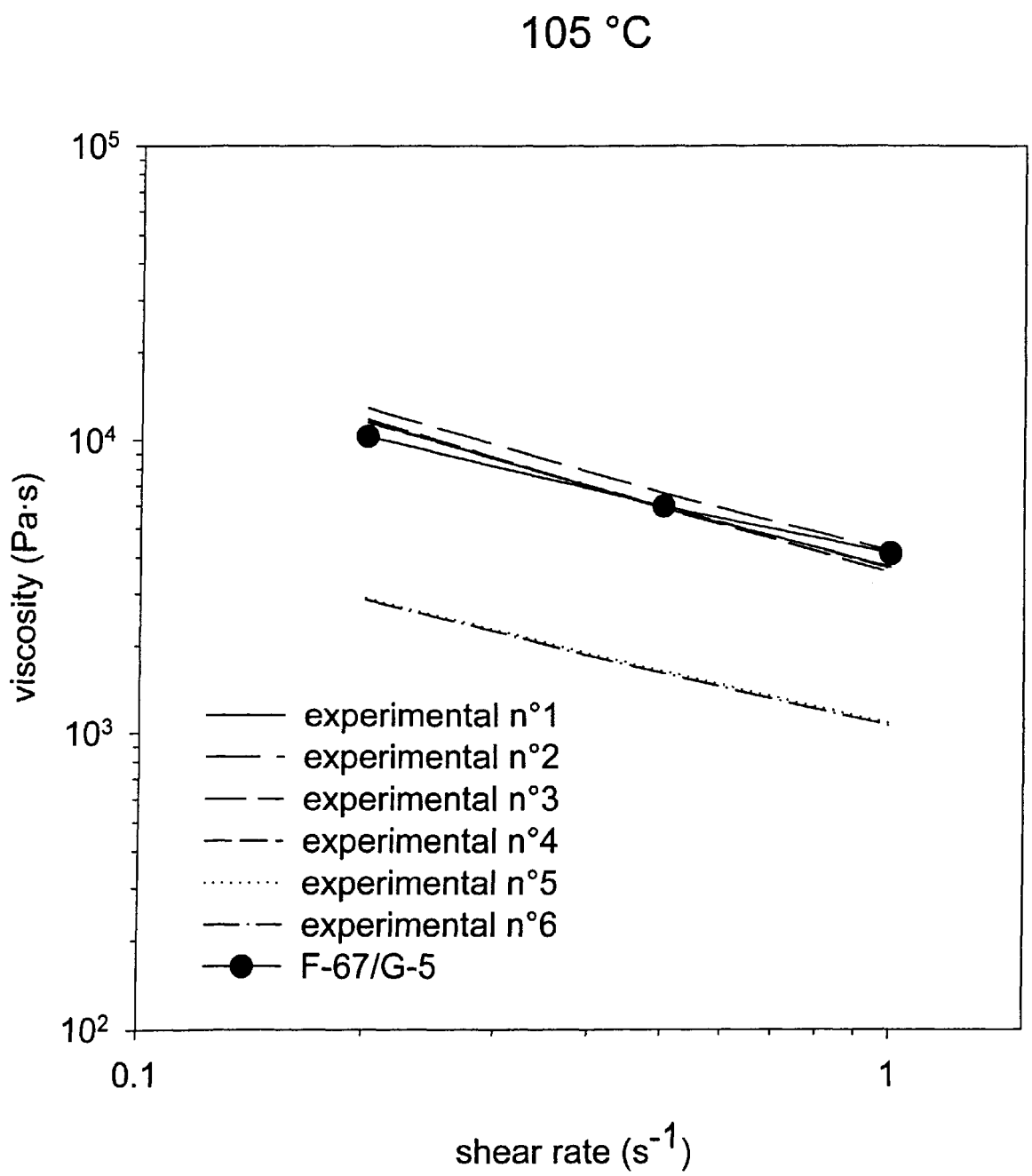
FIGS. 2–4 depict the viscosity of the inventive strand filling compounds as a function of shear rates at 105° C., 140° C., and 180° C. compared to the strand filling compound of the '593 patent.
Figure 3:
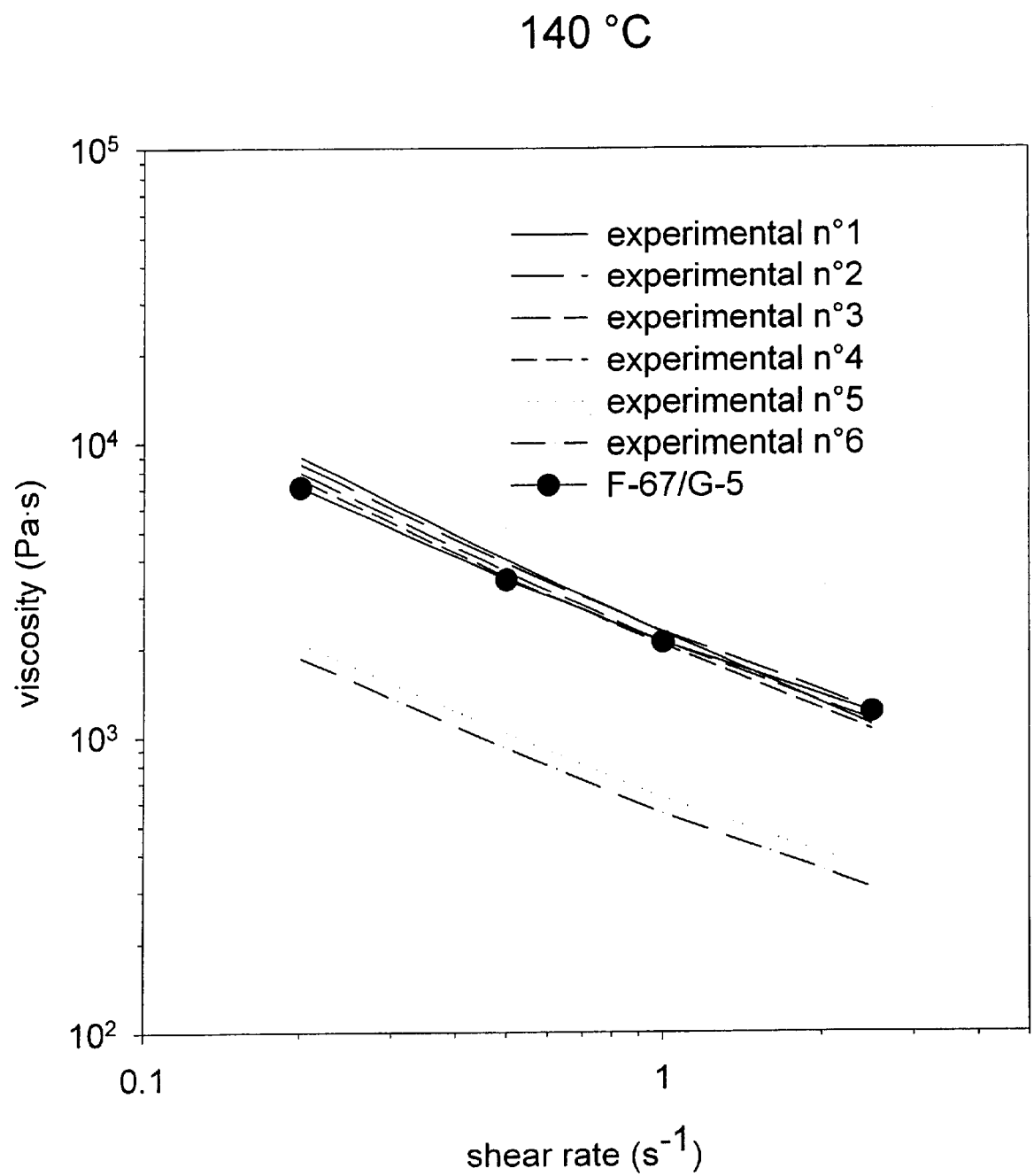
Figure 4:
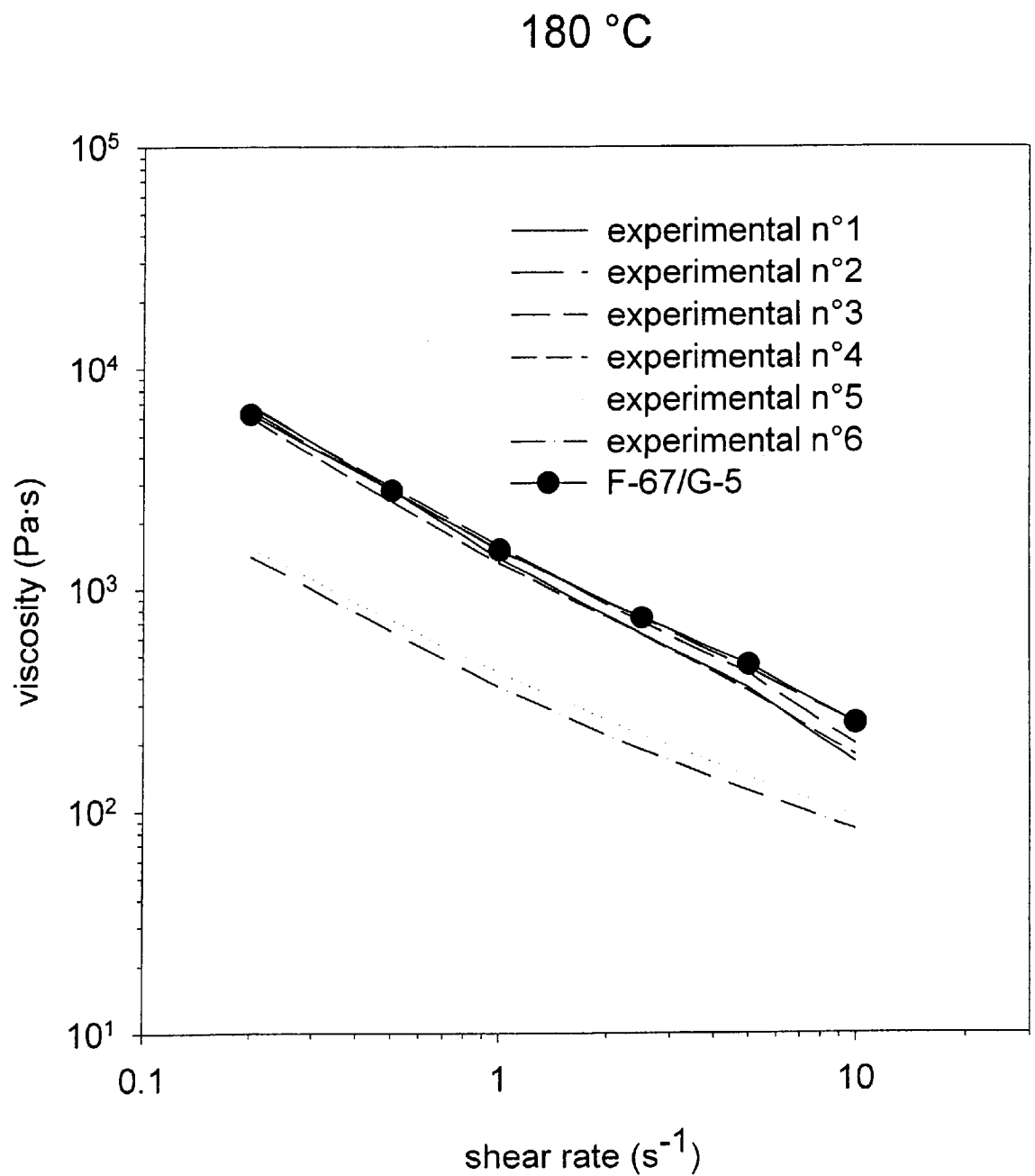

The rheological performance of the inventive strand filling compounds was determined and compared to the prior art compound. Referring to FIGS. 2–4, it is clear that the inventive compounds exhibit the same rheological performance as the prior art compound within experimental error. Although the inventive compounds appear to exhibit a higher viscosity at very low shear rates which may indicate an improvement in the droop characteristics of the inventive compounds during extrusion.

EXAMPLE 5–6

Two stranding filling compounds were made according to the present invention using commercial grades of an adhesive poly(ethylene-co-vinyl acetate) (EVA) minor phase, a poly(isobutylene) (PIB) major phase, a polybutene adhesive extender filler in the major phase, and furnace grade carbon black. The characteristics of the materials used in this example are set forth in Tables 6–7.

TABLE 6

Experimental conductor strand sealant n° 5

| component | type | supplier | characteristics | phr | w/w |
|---|---|---|---|---|---|
| Vistanex LM-MH | poly-(isobutylene) | Exxon | cold flow adhesive | 70 | 29.81 |
| Indopol H-1500 | polybutene | Amoco | adhesive extender | 30 | 12.78 |
| Ultrathene 665-67 | poly-(ethylene-co-vinyl | Equistar | MFI = 800; | 100 | 42.59 |
| Vulcan XC-72 | carbon black | Cabot Corp. | furnace grade | 24 | 10.22 |
| Sunpar 150 | polyolefin oil | Sunoco | sulphur = 0.08 w/w | 9.55 | 4.07 |
| Irganox 1010 | antioxidant | CIBA | | 1.26 | 0.54 |
| | | | | 234.81 | 100.01 |

TABLE 7

Experimental conductor strand sealant n° 6

| component | type | supplier | characteristics | phr | w/w |
|---|---|---|---|---|---|
| Vistanex LM-MH | poly-(isobutylene) | Exxon | cold flow adhesive | 70 | 29.81 |
| Indopol H-1500 | polybutene | Amoco | adhesive extender | 30 | 12.78 |
| Ultrathene 669-67 | poly-(ethylene-co-vinyl | Equistar | MFI = 2700; | 100 | 42.59 |
| Vulcan XC-72 | carbon black | Cabot Corp. | furnace grade | 24 | 10.22 |
| Sunpar 150 | polyolefin oil | Sunoco | sulphur = 0.08 w/w | 9.55 | 4.07 |
| Irganox 1010 | antioxidant | CIBA | | 1.26 | 0.54 |
| | | | | 234.81 | 100.01 |

The strand filling compounds of Tables 6 and 7 were mixed according to the following procedure in Table 8.

TABLE 8

Mixing procedure of conductor strand sealants n° 5 & n° 6

| action | time (min) | temperature |
|---|---|---|
| steam on; mixer off; | 0 | 21.1° C. |
| add ½ of XC-72 | 9–14 | |
| add final ½ of XC-72 | | 82.2° C. |
| | 17–21 | |
| add all of the | 25 | 96.7° C. |
| add Indopol H-1500 | 30 | |
| add Irgonox 1010 | 31 | |
| add Sunpar 150 | 32 | |
| | 35 | 90.6° C. |

Note in the present examples, all of the conductive filler was dispersed in the minor phase material before melt blending with the major phase material.

The strand filling compounds made in the present examples were measured for volume resistivity over temperature and compared to prior art strand filling compound. The results of these measurements are presented in FIG. 1. As can be seen from the FIG. 1, the inventive strand filling compounds of the present example have volume resisitivities about 50% less than that of the prior art compound (F-67/G-5) with 5% by weight of total composite less conductive filler content.

The rheological performance of the inventive strand filling compounds of the present examples was determined and compared to the prior art compound. Referring to FIGS. 2–4, it is clear that the inventive compounds exhibit lower viscosity's than the prior art compound or the examples 1–4. The lower viscosity's are most likely primarily due to the reduced carbon black concentration in the formulation 5 & 6. Thus the present examples provide strand sealing compound which is more easily pumpable than the prior art compound.

While various embodiments of the invention have been shown and described, it is to be understood that the above-described embodiments are merely illustrative of the invention and other embodiments may be devised by those skilled in the art which will embody the principles of the invention and fall within the spirit and scope thereof.

What is claimed is:

1. A filling composition for filling interstices between a plurality of wires of a conductor comprising:

a minor phase polymeric material;

a conductive filler dispersed in said minor phase material in an amount sufficient to generate a continuous conductive network in said minor phase material;

a major phase material comprised of a low molecular weight polymer, said minor phase material with said conductive filler dispersed therein dispersed in said major phase material in an amount sufficient to generate a continuous conductive network in said major phase material, said major phase material and said minor phase material being such that when mixed together do not engage in electrostatic interactions which promote miscibility, and a water swellable material, said water swellable material being admixed with said filling composition and said filling composition being pumpable at elevated temperatures of about greater than 100° C.

2. The filling composition of claim 1 wherein said water swellable material is provided as a thin layer of fine particles dispersed over said filling composition.

3. The filling composition of claim 2 or 3 wherein said water swellable material is selected from the group consisting of sodium polyacrylate, esters of methyl cellulose, esters of cellulose ethers, polyacrylates, polyacrylamides, polyacrylates and polyacrylamides copolymerized with natural polymers, and mixtures thereof.

4. The filling composition of claim 1, wherein said conductive filler is selected from the group consisting of carbon black, graphite, metallic particles, and mixtures thereof.

5. The filling composition of claim 1, wherein said conductive filler comprises less than about 11% of the total weight of said filling composition and is selected from the group consisting of acetylene blacks, furnace grade carbon blacks, and graphite.

6. The filling composition of claim 1, wherein said major phase material is poly(isobutylene).

7. The filling composition of claim 1, wherein said minor phase material is an EVA.

8. The filling composition of claim 1 further comprising an adhesive extender incorporated in said major phase material in an amount of about ≦20% by weight of said filling composition.

9. The filling composition of claim 1 further comprising an adhesive extender incorporated in said major phase material in an amount of about ≦15% by weight of said filling composition.

10. The filling composition of claim 1 further comprising material selected from the group consisting of antioxidants, nucleating agents, reinforcing fillers, plasticizers, processing aids, lubricants, viscosity control agents, tackifiers, anti-blocking agents, extender oils, metal deactivators, and combinations thereof added to said filling composition in the amount of about 0.05% by weight to about 10% by weight of said filling composition.

11. An electrical power transmission cable including a conductor surrounded by insulation material and a filling compound filling any interstices in said conductor, said filling compound comprising:

a minor phase polymeric material;

a conductive filler dispersed in said minor phase material in an amount sufficient to generate a continuous conductive network in said minor phase material;

a major phase material comprised of a low molecular weight polymer, said minor phase material with said conductive filler dispersed therein dispersed in said major phase material in an amount sufficient to generate a continuous conductive network in said major phase material, said major phase material and said minor phase material being such that when mixed together do not engage in electrostatic interactions which promote miscibility, and a water swellable material, said water swellable material being admixed with said filling composition and said filling composition being pumpable at elevated temperatures of about greater than 100C° C.

12. The electrical power transmission cable of claim 11 wherein said water swellable material is provided as a thin layer of fine particles dispersed over said filling composition.

13. The electrical power transmission cable of claim 11 or 12 wherein said water swellable material is selected from the group consisting of sodium polyacrylate, esters of methyl cellulose, esters of cellulose ethers, polyacrylates, polyacrylamides, polyacrylates and polyacrylamides copolymerized with natural polymers, and mixtures thereof.

14. The electrical power transmission cable of claim 11, wherein said conductive filler is selected from the group consisting of carbon black, graphite, metallic particles, and mixtures thereof.

15. The electrical power transmission cable of claim 11, wherein said conductive filler comprises less than about 11% of the total weight of said filling composition and is selected from the group consisting of acetylene blacks, furnace grade carbon blacks, and graphite.

16. The electrical power transmission cable of claim 11, wherein said major phase material is a poly(isobutylene).

17. The electrical power transmission cable of claim 11, wherein said minor phase material is an adhesive EVA.

18. The electrical power transmission cable of claim 11 further comprising an adhesive extender incorporated in said major phase material in an amount of about $\leq 20\%$ by weight of said filling composition.

19. The electrical power transmission cable of claim 11, further comprising an adhesive extender incorporated in said major phase material in an amount of about $\leq 15\%$ by weight of said filling composition.

20. The electrical power transmission cable of claim 11, further comprising material selected from the group consisting of antioxidants, nucleating agents, reinforcing fillers, plasticizers, processing aids, lubricants, viscosity control agents, tackifiers, anti-blocking agents, extender oils, metal deactivators, and combinations thereof added to said filling composition in the amount of about 0.05% by weight to about 10% by weight of said filling composition.

21. A filling composition for filling interstices between a plurality of wires of a conductor comprising:

a minor phase polymeric material;

a conductive filler dispersed preferentially in said minor phase material in an amount sufficient to generate a continuous conductive network in said minor phase material; and a major phase material comprised of a low molecular weight polymer, said minor phase material with said conductive filler dispersed therein dispersed in said major phase material in an amount sufficient to generate a continuous conductive network in said major phase material, said major phase material and said minor phase material being such that when mixed together do not engage in electrostatic interactions which promote miscibility, and a water swellable material, said water swellable material being admixed with said filling composition and said filling composition being pumpable at elevated temperatures of about greater than 100° C.

* * * * *